United States Patent
Kono

(10) Patent No.: US 9,693,435 B2
(45) Date of Patent: Jun. 27, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Masaru Kono, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/978,759

(22) Filed: Dec. 22, 2015

(65) Prior Publication Data
US 2016/0262246 A1   Sep. 8, 2016

(30) Foreign Application Priority Data

Mar. 3, 2015  (JP) ................................. 2015-041014

(51) Int. Cl.
H04N 9/31    (2006.01)
H05B 41/282  (2006.01)
G03B 21/20   (2006.01)

(52) U.S. Cl.
CPC ..... H05B 41/2828 (2013.01); G03B 21/2026 (2013.01); G03B 21/2053 (2013.01); H04N 9/3197 (2013.01)

(58) Field of Classification Search
CPC ........ H04N 9/31; H04N 9/3197; G03B 21/20; G03B 21/2053; G03B 21/2026; H05B 41/282; H05B 41/2828
USPC ........................... 348/761; 315/291, 224, 246
See application file for complete search history.

(56) References Cited

U.S. PATENT DOCUMENTS

| 7,274,157 B2* | 9/2007 | Hirata | H05B 41/2885 315/291 |
| 7,511,432 B2* | 3/2009 | Watanabe | H05B 41/2928 315/209 R |
| 7,855,512 B2* | 12/2010 | Ozasa | H05B 41/2928 315/209 R |
| 8,164,266 B2* | 4/2012 | Okamoto | H05B 41/2888 313/631 |
| 2010/0033103 A1* | 2/2010 | Kimura | H05B 41/2928 315/246 |
| 2010/0084987 A1* | 4/2010 | Yamauchi | H05B 41/38 315/224 |

FOREIGN PATENT DOCUMENTS

JP   2007-059281 A   3/2007

* cited by examiner

*Primary Examiner* — Trang U Tran
(74) *Attorney, Agent, or Firm* — Oliff PLC

(57) ABSTRACT

A discharge lamp driving device includes: a discharge lamp drive unit configured to supply a drive current to a discharge lamp having two electrodes; a voltage detection unit configured to detect an inter-electrode voltage of the discharge lamp; and a control unit configured to control the discharge lamp drive unit, wherein the control unit executes first measurement drive in which a polarity of the drive current is maintained constant at a first polarity, the voltage detection unit measures the inter-electrode voltage multiple times in a first measurement period in which the first measurement drive is executed, and the control unit determines states of the electrodes of the discharge lamp based on a plurality of the inter-electrode voltages measured in the first measurement period.

15 Claims, 10 Drawing Sheets

DISCHARGE LAMP DRIVING DEVICE, PROJECTOR, AND DISCHARGE LAMP DRIVING METHOD

BACKGROUND

1. Technical Field

The present invention relates to a discharge lamp driving device, a projector, and a discharge lamp driving method.

2. Related Art

For example, JP-A-2007-59281 discloses a projector in which in a case where a lamp voltage is less than or equal to a reference voltage, it is determined that the state of a discharge lamp is abnormality.

In the projector described above, the state of the discharge lamp is determined based on only the lamp voltage, that is, an inter-electrode distance. For this reason, the state of the discharge lamp cannot be accurately grasped, and there is a case where the life of the discharge lamp decreases.

Specifically, for example, in the projector described above, it is not possible to detect the thickness of a projection of an electrode tip of the discharge lamp. For this reason, in a case where the lamp voltage is greater than the reference voltage and the projection of the electrode tip is thin, there is a concern that the discharge lamp may rapidly deteriorate due to the projection being missing.

SUMMARY

An advantage of some aspects of the invention is to provide a discharge lamp driving device in which it is possible to improve the life of a discharge lamp, a light source device which is provided with such a discharge lamp driving device, and a projector which is provided with such a light source device. Another advantage of some aspects of the invention is to provide a discharge lamp driving method in which it is possible to improve the life of a discharge lamp.

A discharge lamp driving device according to an aspect of the invention includes: a discharge lamp drive unit configured to supply a drive current to a discharge lamp having two electrodes; a voltage detection unit configured to detect an inter-electrode voltage of the discharge lamp; and a control unit configured to control the discharge lamp drive unit, wherein the control unit executes first measurement drive in which a polarity of the drive current is maintained constant at a first polarity, the voltage detection unit measures the inter-electrode voltage multiple times in a first measurement period in which the first measurement drive is executed, and the control unit determines states of the electrodes of the discharge lamp based on a plurality of the inter-electrode voltages measured in the first measurement period.

According to the discharge lamp driving device according to an aspect of the invention, the control unit determines the states of the electrodes of the discharge lamp, based on the inter-electrode voltages measured multiple times in the first measurement period. A change of the inter-electrode voltage in a certain period in which a polarity is maintained becomes smaller as the thickness of the electrode is thick, and becomes larger as the thickness of the electrode is thin. For this reason, for example, the control unit can determine the thickness of the electrode, based on a difference between the plural inter-electrode voltages measured. Therefore, according to the discharge lamp driving device according to the aspect of the invention, it is possible to more accurately grasp the state of the electrode, and therefore, it becomes possible to appropriately cope with deterioration of the electrode. As a result, it is possible to improve the life of the discharge lamp.

The discharge lamp driving device according to the aspect of the invention may be configured such that the control unit executes steady lighting drive in which an alternating current is supplied to the discharge lamp, and a length of the first measurement period is greater than a length of a half cycle of the alternating current in a steady lighting period in which the steady lighting drive is executed.

According to this configuration, a difference in the amount of change of the inter-electrode voltage according to the thickness of the electrode can be increased, and thus it is possible to more accurately grasp the thickness of the electrode.

The discharge lamp driving device according to the aspect of the invention may be configured such that an absolute value of the drive current which is supplied to the discharge lamp in the first measurement period is smaller than an absolute value of the drive current which is supplied to the discharge lamp in the steady lighting period.

According to this configuration, it is possible to suppress the electrode being excessively melted, thereby being lost.

The discharge lamp driving device according to the aspect of the invention may be configured such that a total length of the length of the first measurement period and a length of a period which is provided to be temporally continuous with the first measurement period and has a second polarity opposite to the first polarity is approximately equal to a length of one cycle of the alternating current in the steady lighting period.

According to this configuration, it is possible to provide the first measurement period by changing a duty ratio of the alternating current which is supplied to the discharge lamp in the steady lighting period, and therefore, it is simple.

The discharge lamp driving device according to the aspect of the invention may be configured such that the control unit calculates the amount of change of the inter-electrode voltage in the first measurement period based on the plurality of inter-electrode voltages measured in the first measurement period and executes drive to cause growths of the electrodes in a case where the amount of change is greater than or equal to a predetermined value.

According to this configuration, it is possible to improve the life of the discharge lamp.

The discharge lamp driving device according to the aspect of the invention may be configured such that the control unit executes second measurement drive in which a second polarity opposite to the first polarity of the drive current in the first measurement drive is maintained, the voltage detection unit measures the inter-electrode voltage multiple times in a second measurement period in which the second measurement drive is executed, and the control unit determines the states of the electrodes of the discharge lamp based on the inter-electrode voltages measured in the first measurement period and the second measurement period.

According to this configuration, it is possible to grasp the states of the two electrodes.

The discharge lamp driving device according to the aspect of the invention may be configured such that the second measurement period is provided to be temporally separated from the first measurement period.

According to this configuration, the second measurement period is started in a state where the shapes of the two electrodes are stable, and therefore, it is easy to more accurately grasp the states of the electrodes.

The discharge lamp driving device according to the aspect of the invention may be configured such that the second measurement period is provided to be temporally continuous with the first measurement period.

According to this configuration, it is possible to grasp the states of the two electrodes at a time.

The discharge lamp driving device according to the aspect of the invention may be configured such that a length of the first measurement period and a length of the second measurement period are approximately equal to each other.

According to this configuration, it is possible to provide the first measurement period and the second measurement period by changing the frequency of the drive current, and therefore, it is simple.

The discharge lamp driving device according to the aspect of the invention may be configured such that the control unit calculates a first amount of change of the inter-electrode voltage in the first measurement period based on the inter-electrode voltages measured in the first measurement period, calculates a second amount of change of the inter-electrode voltage in the second measurement period based on the inter-electrode voltages measured in the second measurement period, and executes drive to cause growths of the electrodes in a case where at least one of the first amount of change and the second amount of change is greater than or equal to a predetermined value.

According to this configuration, even in a case where either of the electrodes has deteriorated, it is possible to appropriately cope with it, and therefore, it is possible to further improve the life of the discharge lamp.

The discharge lamp driving device according to the aspect of the invention may be configured such that the predetermined value is set based on the measured inter-electrode voltages.

According to this configuration, it is possible to improve the life of the discharge lamp.

A light source device according to another aspect of the invention includes: the discharge lamp configured to emit light; and the discharge lamp driving device described above.

According to this configuration, the light source device is provided with the discharge lamp driving device described above, and therefore, it is possible to improve the life of the discharge lamp.

A projector according to still another aspect of the invention includes: the light source device described above; a light modulation element configured to modulate light which is emitted from the light source device, according to a video signal; and a projection optical system configured to project light modulated by the light modulation element.

According to this configuration, the projector is provided with the light source device described above, and therefore, it is possible to improve the life of the discharge lamp.

The projector according to the aspect of the invention may be configured such that the projector further includes an input receiving unit configured to receive an operation, and the control unit executes the measurement drive in a case where the input receiving unit receives an operation.

According to this configuration, even in a case where the value of the drive current in the measurement period changes, it is difficult to cause a user to recognize a luminance change of a picture which is projected from the projection optical system.

The projector according to the aspect of the invention may be configured such that the control unit executes the measurement drive in a period in which the light which is emitted from the discharge lamp is not projected from the projection optical system.

According to this configuration, even in a case where the value of the drive current in the measurement period changes, the luminance of a picture which is projected from the projection optical system does not change.

A discharge lamp driving method according to yet another aspect of the invention is a discharge lamp driving method of supplying a drive current to a discharge lamp having electrodes to drive the discharge lamp, including: executing measurement drive in which a polarity of the drive current is maintained constant; measuring an inter-electrode voltage multiple times in a measurement period in which the measurement drive is executed; and determining states of the electrodes of the discharge lamp based on a plurality of the inter-electrode voltages measured in the measurement period.

According to this configuration, it is possible to improve the life of the discharge lamp in the same manner as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment of the invention will be described with reference to the drawings.

In addition, the scope of the invention is not limited to the following embodiments and can be arbitrarily changed within the scope of the technical idea of the invention. Further, in the following drawings, in order to facilitate understanding of the respective configurations, there is a case where a reduced scale, the number, or the like in each structure is made to be different from that in the actual structure.

First Embodiment

Figure 1:
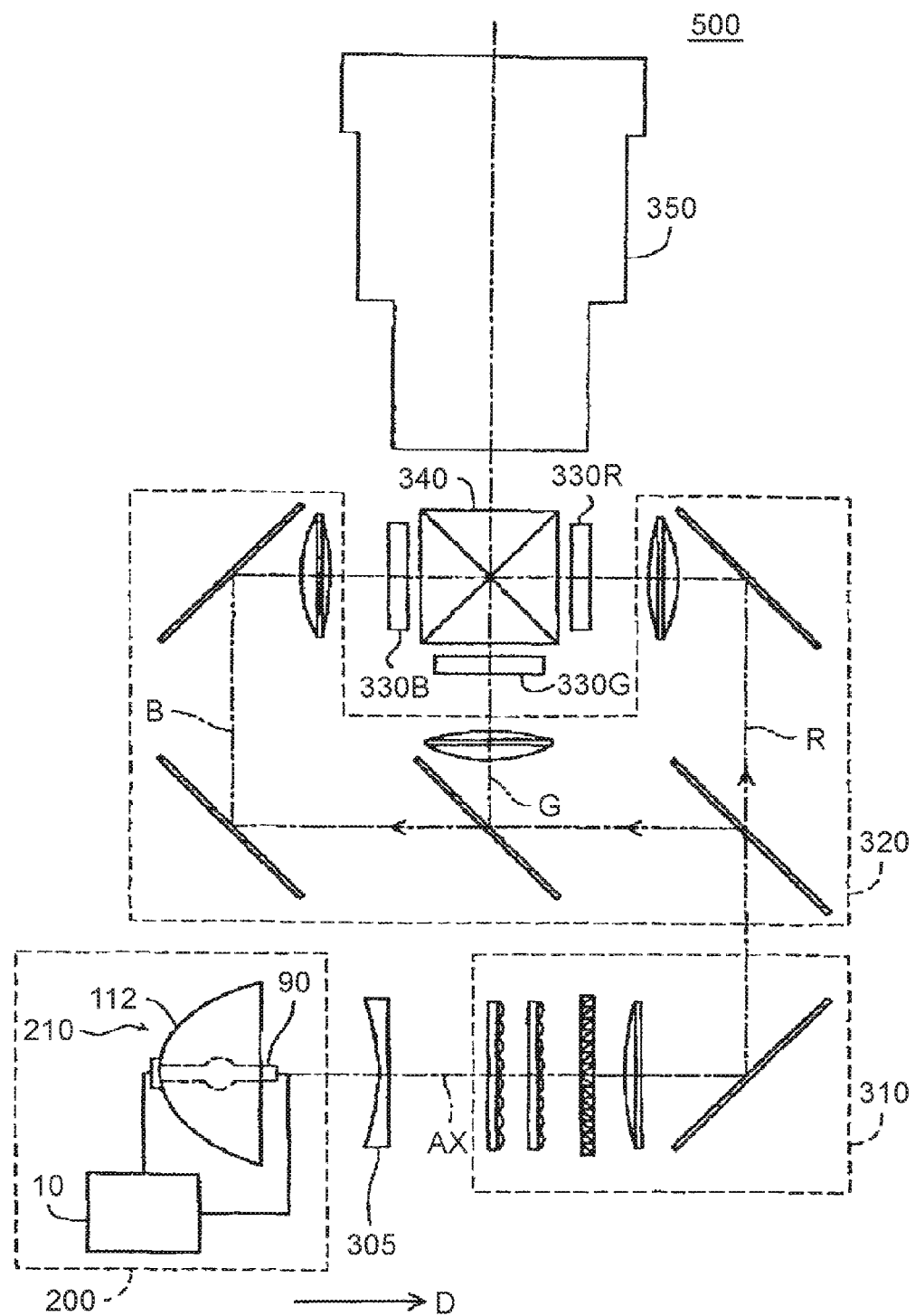
FIG. 1 is a schematic configuration diagram of a projector of a first embodiment.

As shown in FIG. 1, a projector 500 of this embodiment is provided with a light source device 200, a collimating lens 305, an illumination optical system 310, a color separation optical system 320, three liquid crystal light valves (light modulation elements) 330R, 330G, and 330B, a cross dichroic prism 340, and a projection optical system 350.

The light emitted from the light source device 200 passes through the collimating lens 305 and is incident on the illumination optical system 310. The collimating lens 305 collimates the light from the light source device 200.

The illumination optical system 310 adjusts the illuminance of the light which is emitted from the light source device 200, so as to uniformize the illuminance on the liquid crystal light valves 330R, 330G, and 330B. Further, the illumination optical system 310 aligns a polarization direction of the light which is emitted from the light source device 200, in one direction. The reason is for effectively using the light which is emitted from the light source device 200 in the liquid crystal light valves 330R, 330G, and 330B.

The light with an illuminance distribution and the polarization direction adjusted is incident on the color separation optical system 320. The color separation optical system 320 separates the incident light into three color lights; red light (R), green light (G), and blue light (B). The three color lights are respectively modulated according to a video signal by the liquid crystal light valves 330R, 330G, and 330B correlated with the respective color lights. The liquid crystal light valves 330R, 330G, and 330B are respectively provided with liquid crystal panels 560R, 560G, and 560B (described later) and polarizing plates (not shown). The polarizing plates are disposed on the light incidence side and the light emission side of each of the liquid crystal panels 560R, 560G, and 560B.

The modulated three color lights are synthesized by the cross dichroic prism 340. The synthesized light is incident on the projection optical system 350. The projection optical system 350 projects the incident light onto a screen 700 (refer to FIG. 3). In this way, a picture is displayed on the screen 700. In addition, as the configuration of each of the collimating lens 305, the illumination optical system 310, the color separation optical system 320, the cross dichroic prism 340, and the projection optical system 350, a well-known configuration can be adopted.

Figure 2:
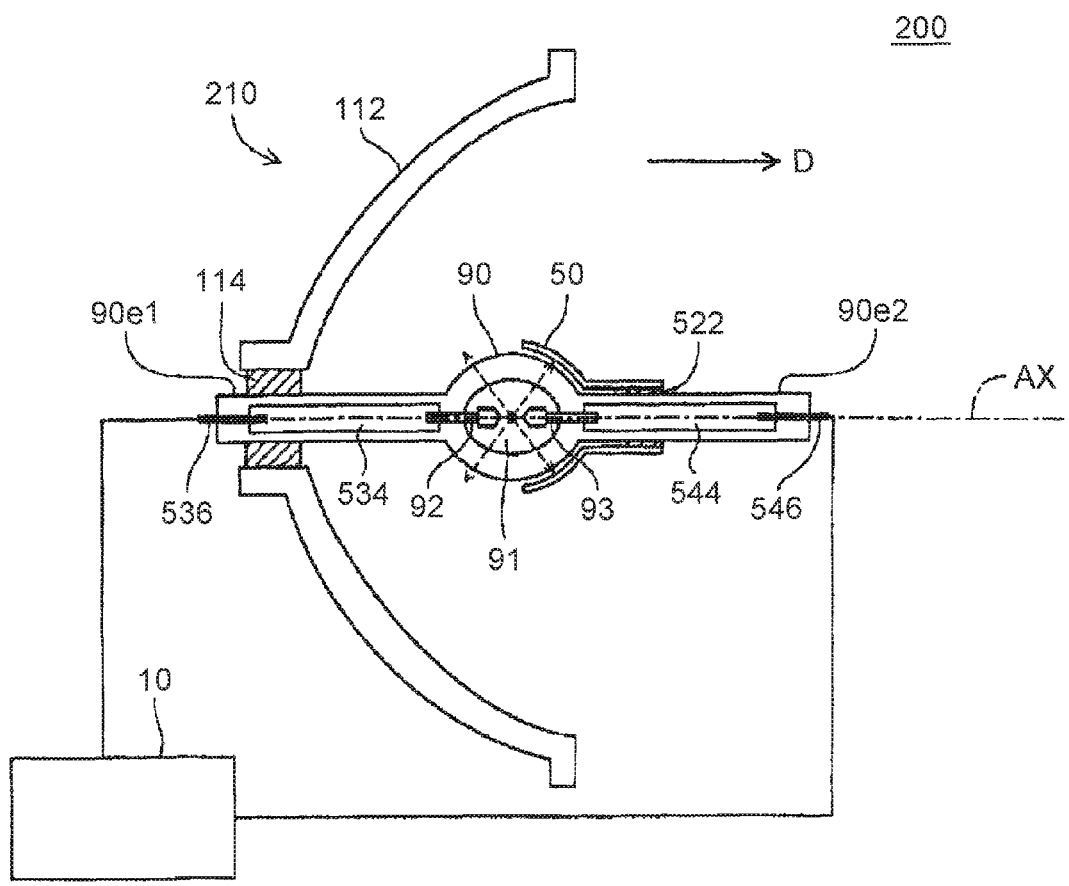
FIG. 2 is a cross-sectional view of a discharge lamp in the first embodiment.

FIG. 2 is a cross-sectional view showing the configuration of the light source device 200. The light source device 200 is provided with a light source unit 210 and a discharge lamp lighting device (a discharge lamp driving device) 10. In FIG. 2, a cross-sectional view of the light source unit 210 is shown. The light source unit 210 is provided with a main reflector 112, a discharge lamp 90, and a sub-reflector 50.

The discharge lamp lighting device 10 supplies a drive current I to the discharge lamp 90, thereby turning on the discharge lamp 90. The main reflector 112 reflects light emitted from the discharge lamp 90, toward an irradiation direction D. The irradiation direction D is parallel to an optical axis AX of the discharge lamp 90.

The shape of the discharge lamp 90 is a rod shape extending along the irradiation direction D. An end portion on one side of the discharge lamp 90 is referred to as a first end portion 90e1 and an end portion on the other side of the discharge lamp 90 is referred to as a second end portion 90e2. A material of the discharge lamp 90 is a light-transmitting material such as quartz glass, for example. A central portion of the discharge lamp 90 bulges out in a spherical shape and the inside thereof is a discharge space 91. The discharge space 91 is filled with gas that is a discharge medium which includes noble gas, a metal halide compound, or the like.

The tips of a first electrode (an electrode) 92 and a second electrode (an electrode) 93 protrude into the discharge space 91. The first electrode 92 is disposed on the first end portion 90e1 side of the discharge space 91. The second electrode 93 is disposed on the second end portion 90e2 side of the discharge space 91. The shape of each of the first electrode 92 and the second electrode 93 is a rod shape extending along the optical axis AX. In the discharge space 91, electrode tip portions of the first electrode 92 and the second electrode 93 are disposed so as to face each other to be spaced apart by a predetermined distance. A material of each of the first electrode 92 and the second electrode 93 is metal such as tungsten, for example.

A first terminal 536 is provided in the first end portion 90e1 of the discharge lamp 90. The first terminal 536 and the first electrode 92 are electrically connected by a conductive member 534 which penetrates through the inside of the discharge lamp 90. Similarly, a second terminal 546 is provided in the second end portion 90e2 of the discharge lamp 90. The second terminal 546 and the second electrode 93 are electrically connected by a conductive member 544 which penetrates through the inside of the discharge lamp 90. A material of each of the first terminal 536 and the second terminal 546 is metal such as tungsten, for example. As a material of each of the conductive members 534 and 544, for example, molybdenum foil is used.

The first terminal 536 and the second terminal 546 are connected to the discharge lamp lighting device 10. The discharge lamp lighting device 10 supplies the drive current I for driving the discharge lamp 90 to the first terminal 536 and the second terminal 546. As a result, arc discharge occurs between the first electrode 92 and the second electrode 93. Light (discharge light) generated by the arc discharge is emitted toward all directions from a discharge position, as shown by dashed arrows.

The main reflector 112 is fixed to the first end portion 90e1 of the discharge lamp 90 by a fixing member 114. The main reflector 112 reflects light which proceeds toward the opposite side to the irradiation direction D, of the discharge light, toward the irradiation direction D. The shape of the reflective surface (the surface on the discharge lamp 90 side) of the main reflector 112 is not particularly limited within a range capable of reflecting the discharge light toward the irradiation direction D and may be, for example, a rotating spheroidal shape or a rotating parabolic shape. For example, in a case where the shape of the reflective surface of the main reflector 112 is a rotating parabolic shape, the main reflector 112 can convert the discharge light into light substantially parallel to the optical axis AX. In this way, it is possible to omit the collimating lens 305.

The sub-reflector 50 is fixed to the second end portion 90e2 side of the discharge lamp 90 by a fixing member 522. The shape of the reflective surface (the surface on the discharge lamp 90 side) of the sub-reflector 50 is a spherical shape which surrounds the portion on the second end portion 90e2 side of the discharge space 91. The sub-reflector 50 reflects light which proceeds toward the side opposite to the side on which the main reflector 112 is disposed, of the discharge light, toward the main reflector 112. In this way, it is possible to increase the use efficiency of light which is emitted from the discharge space 91.

A material of each of the fixing members 114 and 522 is not particularly limited within a range of a heat-resistant material capable of withstanding heat generation from the discharge lamp 90 and is, for example, an inorganic adhesive. As a method of fixing the disposition between the main reflector 112 and the sub-reflector 50, and the discharge lamp 90, it is not limited to a method of fixing the main reflector 112 and the sub-reflector 50 to the discharge lamp 90 and any method can be adopted. For example, the discharge lamp 90 and the main reflector 112 may be independently fixed to a casing (not shown) of the projector 500. The same applies to the sub-reflector 50.

Hereinafter, a circuit configuration of the projector 500 will be described.

Figure 3:
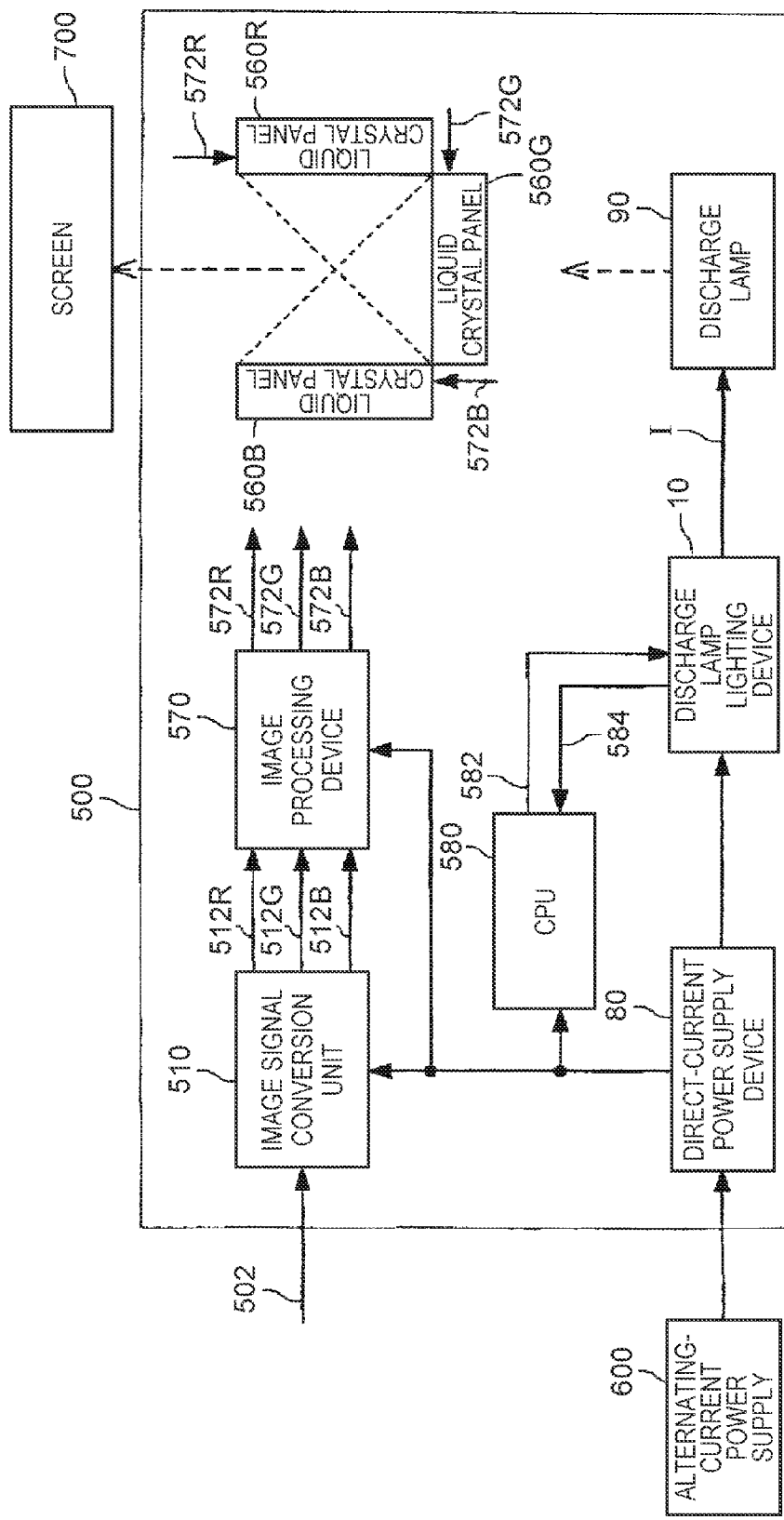
FIG. 3 is a block diagram showing various constituent elements of the projector of the first embodiment.

FIG. 3 is a diagram showing an example of the circuit configuration of the projector 500 of this embodiment. The projector 500 is provided with an image signal conversion unit 510, a direct-current power supply device 80, the liquid crystal panels 560R, 560G, and 560B, an image processing device 570, and a central processing unit (CPU) 580, in addition to the optical systems shown in FIG. 1.

The image signal conversion unit 510 converts an image signal 502 (a luminance-color difference signal, analog RGB signals, or the like) input from the outside, into digital RGB signals having a predetermined word length, thereby generating image signals 512R, 512G, and 512B, and supplies the image signals 512R, 512G, and 512B to the image processing device 570.

The image processing device 570 performs image processing on each of the three image signals 512R, 512G, and 512B. The image processing device 570 supplies drive signals 572R, 572G, and 572B for respectively driving the liquid crystal panels 560R, 560G, and 560B, to the liquid crystal panels 560R, 560G, and 560B.

The direct-current power supply device 80 converts an alternating-current voltage which is supplied from an external alternating-current power supply 600, into a constant direct-current voltage. The direct-current power supply device 80 supplies the direct-current voltage to the image signal conversion unit 510 and the image processing device 570 which are located on the secondary side of a transformer (not show, included in the direct-current power supply device 80) and to the discharge lamp lighting device 10 which is located on the primary side of the transformer.

The discharge lamp lighting device 10 generates a high voltage between the electrodes of the discharge lamp 90 at the time of start-up, thereby causing a breakdown and thus forming a discharge path. Thereafter, the discharge lamp lighting device 10 supplies the drive current I for causing the discharge lamp 90 to maintain discharge.

The liquid crystal panels 560R, 560G, and 560B are respectively provided in the liquid crystal light valves 330R, 330G, and 330B described above. The liquid crystal panels 560R, 560G, and 560B respectively modulate the transmittance (the luminance) of the color lights which are incident on the liquid crystal panels 560R, 560G, and 560B through the optical systems described above, based on the drive signals 572R, 572G, and 572B.

The CPU 580 controls various operations from the lighting start of the projector 500 to the extinction. For example, in the example of FIG. 3, the CPU 580 outputs a lighting command or an extinction command to the discharge lamp lighting device 10 through a communication signal 582. The CPU 580 receives lighting information of the discharge lamp 90 from the discharge lamp lighting device 10 through a communication signal 584.

Hereinafter, the configuration of the discharge lamp lighting device 10 will be described.

Figure 4:
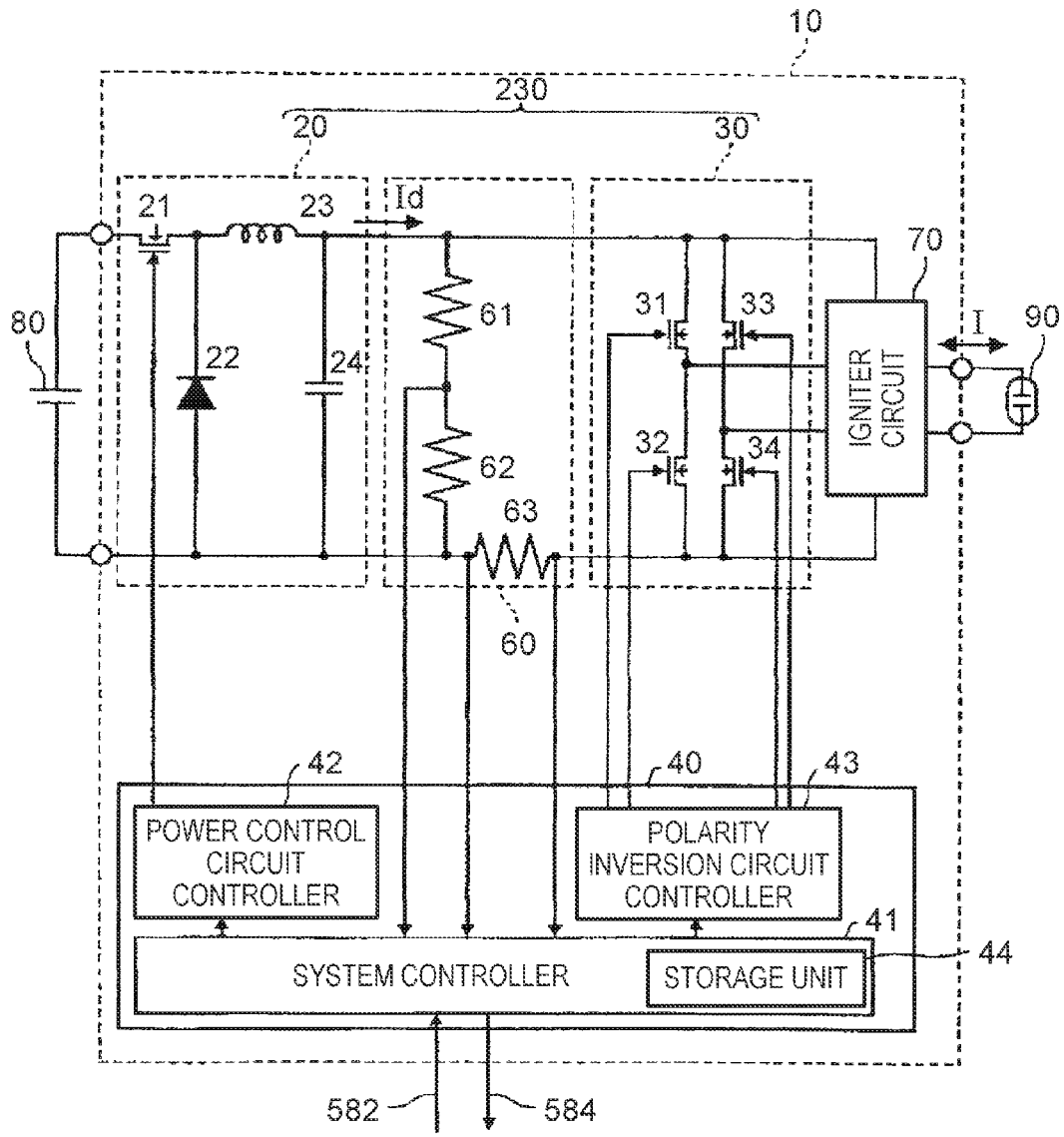
FIG. 4 is a circuit diagram of a discharge lamp lighting device of the first embodiment.

FIG. 4 is a diagram showing an example of a circuit configuration of the discharge lamp lighting device 10.

The discharge lamp lighting device 10 is provided with a power control circuit 20, a polarity inversion circuit 30, a control unit 40, an operation detection unit 60, and an igniter circuit 70, as shown in FIG. 4.

The power control circuit 20 generates drive power which is supplied to the discharge lamp 90. In this embodiment, the power control circuit 20 is configured with a down chopper circuit which uses the voltage from the direct-current power supply device 80 as input, steps down the input voltage, and outputs a direct current Id.

The power control circuit 20 is configured to include a switch element 21, a diode 22, a coil 23, and a capacitor 24. The switch element 21 is configured with, for example, a transistor. In this embodiment, one end of the switch element 21 is connected to the positive voltage side of the direct-current power supply device 80 and the other end is connected to a cathode terminal of the diode 22 and one end of the coil 23.

One end of the capacitor 24 is connected to the other end of the coil 23 and the other end of the capacitor 24 is connected to an anode terminal of the diode 22 and the negative voltage side of the direct-current power supply device 80. A current control signal is input from the control unit 40 (described later) to a control terminal of the switch element 21, whereby ON/OFF of the switch element 21 is controlled. As the current control signal, for example, a pulse width modulation (PWM) control signal may be used.

If the switch element 21 is made to be ON, an electric current flows through the coil 23, and thus energy is stored in the coil 23. Thereafter, if the switch element 21 is made to be OFF, the energy stored in the coil 23 is released to pathways passing through the capacitor 24 and the diode 22. As a result, the direct current Id according to the proportion of time when the switch element 21 is made to be ON is generated.

The polarity inversion circuit 30 inverts the polarity of the direct current Id which is input from the power control circuit 20, at a predetermined timing. In this way, the polarity inversion circuit 30 generates and outputs the drive current I that is a direct current which is maintained by a controlled time, or the drive current I that is an alternating current having an arbitrary frequency. In this embodiment, the polarity inversion circuit 30 is configured with an inverter bridge circuit (a full-bridge circuit).

The polarity inversion circuit 30 includes a first switch element 31, a second switch element 32, a third switch element 33, and a fourth switch element 34, each of which is configured with, for example, a transistor or the like. The polarity inversion circuit 30 has a configuration in which the first switch element 31 and the second switch element 32 connected in series and the third switch element 33 and the fourth switch element 34 connected in series are connected in parallel to each other. A polarity inversion control signal is input from the control unit 40 to each of control terminals of the first switch element 31, the second switch element 32, the third switch element 33, and the fourth switch element 34. An ON/OFF operation of each of the first switch element 31, the second switch element 32, the third switch element 33, and the fourth switch element 34 is controlled based on the polarity inversion control signal.

In the polarity inversion circuit 30, an operation which causes the first switch element 31 and the fourth switch element 34, and the second switch element 32 and the third switch element 33 to be alternately made to be ON/OFF is repeated. In this way, the polarity of the direct current Id which is output from the power control circuit 20 is inverted alternately. The polarity inversion circuit 30 generates and outputs the drive current I that is a direct current which maintains the same polarity state by a controlled time, or the drive current I that is an alternating current having a controlled frequency, from a common connection point of the first switch element 31 and the second switch element 32 and a common connection point of the third switch element 33 and the fourth switch element 34.

That is, the polarity inversion circuit 30 is controlled such that when the first switch element 31 and the fourth switch element 34 are ON, the second switch element 32 and the third switch element 33 become OFF and when the first switch element 31 and the fourth switch element 34 are OFF, the second switch element 32 and the third switch element 33 become ON. Therefore, when the first switch element 31 and the fourth switch element 34 are ON, the drive current I which flows in the order of the first switch element 31, the discharge lamp 90, and the fourth switch element 34 from one end of the capacitor 24 is generated. When the second switch element 32 and the third switch element 33 are ON, the drive current I which flows in the order of the third switch element 33, the discharge lamp 90, and the second switch element 32 from one end of the capacitor 24 is generated.

In this embodiment, a section composed of combination of the power control circuit 20 and the polarity inversion circuit 30 corresponds to a discharge lamp drive unit 230. That is, the discharge lamp drive unit 230 supplies the drive current I which drives the discharge lamp 90, to the discharge lamp 90.

The control unit 40 controls the discharge lamp drive unit 230. In the example of FIG. 4, the control unit 40 controls the power control circuit 20 and the polarity inversion circuit 30, thereby controlling parameters such as a holding time when the drive current I maintains the same polarity, a current value (a power value of drive power) of the drive current I, and a frequency of the drive current I. The control unit 40 performs polarity inversion control which controls a holding time when the drive current I is maintained with the same polarity, a frequency of the drive current I, and the like, on the polarity inversion circuit 30 by a polarity inversion timing of the drive current I. The control unit 40 performs current control which controls a current value of the direct current Id which is output, on the power control circuit 20.

In this embodiment, the control unit 40 can execute a steady lighting mode (steady lighting drive) in which an alternating current is supplied to the discharge lamp 90, a measurement mode (measurement drive) in which the polarity of the drive current I is maintained constant, and a refresh mode which causes growths of a projection of the tip of the first electrode 92 and a projection of the tip of the second electrode 93. The measurement mode includes a first measurement mode in which a polarity becomes a first polarity (described later), and a second measurement mode in which a polarity becomes a second polarity (described later).

In this embodiment, as the refresh mode, there is no particular limitation, and, for example, drive to make the frequency of the drive current I vary toward a high frequency from a low frequency is also acceptable and drive to increase the drive power is also acceptable.

In this embodiment, the control unit 40 determines the states of the electrodes of the discharge lamp 90, based on lamp voltages (inter-electrode voltages) Vla detected in a first measurement period PH21a and a second measurement period PH21b in which the measurement mode is executed. Details will be described in detail later.

The configuration of the control unit 40 is not particularly limited. In this embodiment, the control unit 40 is configured to include a system controller 41, a power control circuit controller 42, and a polarity inversion circuit controller 43. In addition, a portion or the whole of the control unit 40 may be configured with a semiconductor integrated circuit.

The system controller 41 controls the power control circuit controller 42 and the polarity inversion circuit controller 43, thereby controlling the power control circuit and the polarity inversion circuit 30. The system controller 41 may control the power control circuit controller 42 and the polarity inversion circuit controller 43, based on the lamp voltage Vla and the drive current I detected by the operation detection unit 60.

In this embodiment, a storage unit 44 is connected to the system controller 41.

The system controller 41 may control the power control circuit 20 and the polarity inversion circuit 30, based on information stored in the storage unit 44. Information about, for example, drive parameters such as a holding time when the drive current I is maintained with the same polarity, and a current value, a fundamental frequency, a waveform, and a modulation pattern of the drive current I may be stored in the storage unit 44. The fundamental frequency is the frequency of the drive current I which is supplied to the discharge lamp 90 in the steady lighting mode.

The power control circuit controller 42 outputs a current control signal to the power control circuit 20, based on a control signal from the system controller 41, thereby controlling the power control circuit 20.

The polarity inversion circuit controller 43 outputs a polarity inversion control signal to the polarity inversion circuit 30, based on a control signal from the system controller 41, thereby controlling the polarity inversion circuit 30.

The control unit 40 can be realized by using a dedicated circuit so as to perform the above-described control or a variety of control of processing which will be described later. With respect to this, the control unit 40 can also function as a computer, for example, by a CPU executing a control program stored in the storage unit 44, so as to perform a variety of control of the processing.

Figure 5:
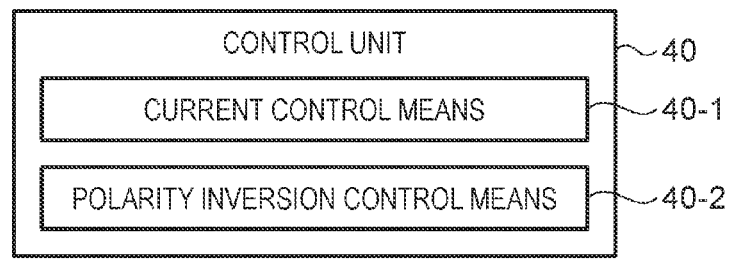
FIG. 5 is a block diagram showing a configuration example of a control unit of the first embodiment.

FIG. 5 is a diagram for describing another configuration example of the control unit 40. As shown in FIG. 5, the control unit 40 may be configured so as to function as current control means 40-1 for controlling the power control circuit 20, and polarity inversion control means 40-2 for controlling the polarity inversion circuit 30, by a control program.

In the example shown in FIG. 4, the control unit 40 is configured as a portion of the discharge lamp lighting device 10. With respect to this, a configuration may be made such that the CPU 580 is responsible for some of the functions of the control unit 40.

In this embodiment, the operation detection unit 60 includes a voltage detection unit which detects the lamp voltage Vla of the discharge lamp 90 and outputs lamp voltage information to the control unit 40. Further, the operation detection unit 60 may include a current detection unit or the like which detects the drive current I and outputs drive current information to the control unit 40. In this embodiment, the operation detection unit 60 is configured to include a first resistor 61, a second resistor 62, and a third resistor 63.

In this embodiment, the voltage detection unit of the operation detection unit 60 detects the lamp voltage Vla by voltages divided in the first resistor 61 and the second resistor 62 connected in series to each other and in parallel with the discharge lamp 90. Further, in this embodiment, the current detection unit detects the drive current I by voltage which is generated in the third resistor 63 connected in series to the discharge lamp 90.

The igniter circuit 70 operates only at the time of the lighting start of the discharge lamp 90. The igniter circuit 70 supplies a high voltage (a higher voltage than that at the time of the normal lighting of the discharge lamp 90) which is necessary for forming a discharge path by performing breakdown between the electrodes (between the first electrode 92 and the second electrode 93) of the discharge lamp 90 at the time of the lighting start of the discharge lamp 90, between the electrodes (between the first electrode 92 and the second electrode 93) of the discharge lamp 90. In this embodiment, the igniter circuit 70 is connected in parallel with the discharge lamp 90.

Figure 6A:
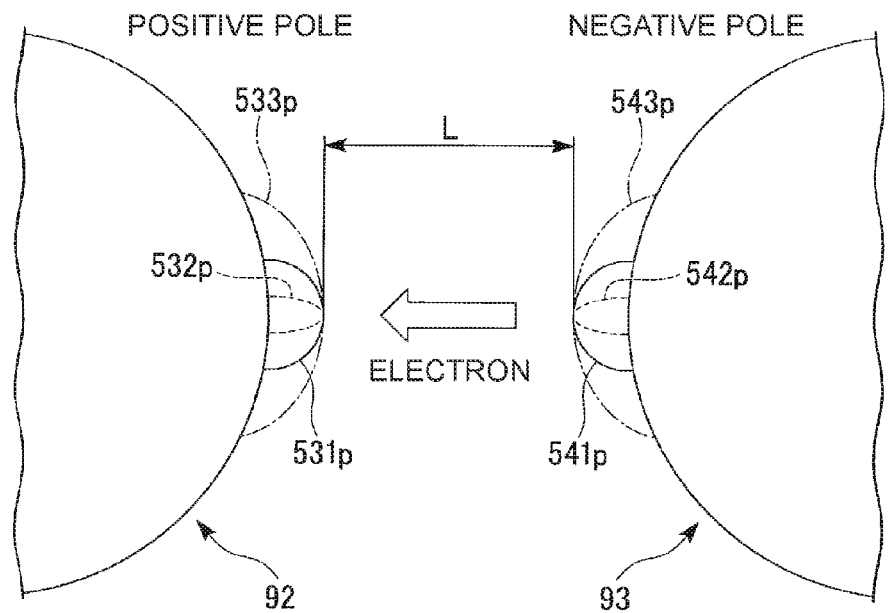
FIGS. 6A and 6B are diagrams showing the states of projections of electrode tips of the discharge lamp.
Figure 6B:
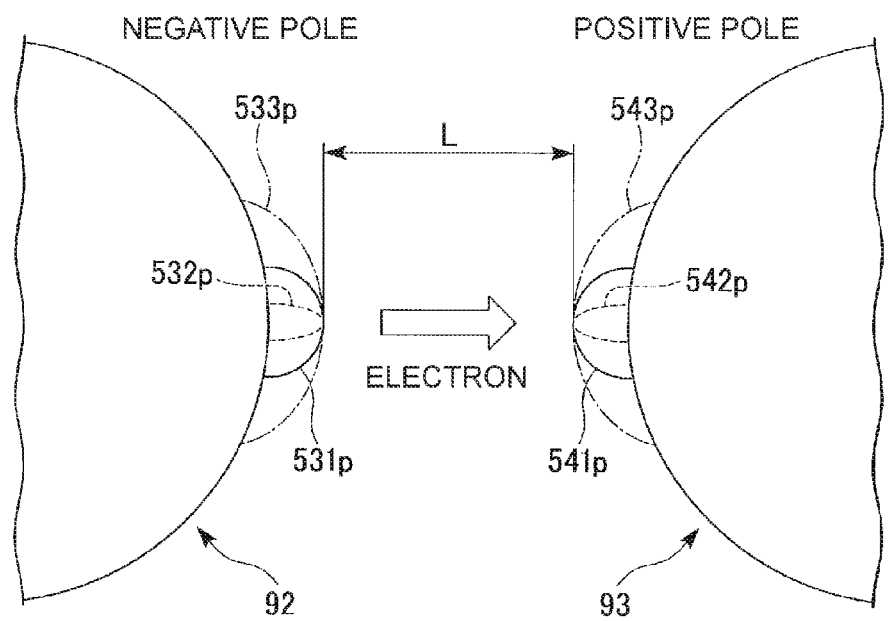

In FIGS. 6A and 6B, tip portions of the first electrode 92 and the second electrode 93 are shown. Projections 531p and 541p are respectively formed at the tips of the first electrode 92 and the second electrode 93. Discharge occurring between the first electrode 92 and the second electrode 93 occurs mainly between the projection 531p and the projection 541p. As in this embodiment, in a case where the projections 531p and 541p are present, a movement of a discharge position (an arc position) in the first electrode 92 and the second electrode 93 can be suppressed, compared to a case where there is no projection.

FIG. 6A shows a first polarity state where the first electrode 92 operates as a positive pole and the second electrode 93 operates as a negative pole. In the first polarity state, electrons move from the second electrode 93 (a negative pole) to the first electrode 92 (a positive pole) due to discharge. Electrons are emitted from the negative pole (the second electrode 93). The electrons emitted from the negative pole (the second electrode 93) collide with the tip of the positive pole (the first electrode 92). Heat is generated due to the collision, and thus the temperature of the tip (the projection 531p) of the positive pole (the first electrode 92) rises.

Further, at this time, the tip (the projection 531p) of the positive pole (the first electrode 92) is shaved off by the electrons colliding therewith, whereby an inter-electrode distance L between the first electrode 92 and the second electrode 93 increases. The inter-electrode distance L is the distance between the projection 531p of the first electrode 92 and the projection 541p of the second electrode 93.

FIG. 6B shows a second polarity state where the first electrode 92 operates as a negative pole and the second electrode 93 operates as a positive pole. In the second polarity state, contrary to the first polarity state, electrons move from the first electrode 92 to the second electrode 93. As a result, the temperature of the tip (the projection 541p) of the second electrode 93 rises. Further, the projection 541p of the second electrode 93 is shaved off, and thus the inter-electrode distance L increases.

In this manner, the drive current I is supplied to the discharge lamp 90, whereby the temperature of the positive pole with which electrons collide rises. On the other hand, in the negative pole which emits electrons, a temperature decreases while electrons are emitted toward the positive pole.

Further, the drive current I is supplied to the discharge lamp 90, whereby the projection of the electrode tip on the positive pole side is shaved off, and thus the inter-electrode distance L increases. If the inter-electrode distance L increases, resistance between the first electrode 92 and the second electrode 93 increases, and therefore, the lamp voltage Vla increases. Therefore, a change of the inter-electrode distance L can be detected by referring to the lamp voltage Vla.

In addition, the first electrode 92 and the second electrode 93 have the same configuration, and therefore, in the following description, there is a case of describing only the first electrode 92 as a representative. Further, the projection 531p of the tip of the first electrode 92 and the projection 541p of the tip of the second electrode 93 have the same configuration, and therefore, in the following description, there is a case of describing only the projection 531p as a representative.

Next, a drive current waveform of the drive current I which is supplied to the discharge lamp 90 in this embodiment will be described.

Figure 7:
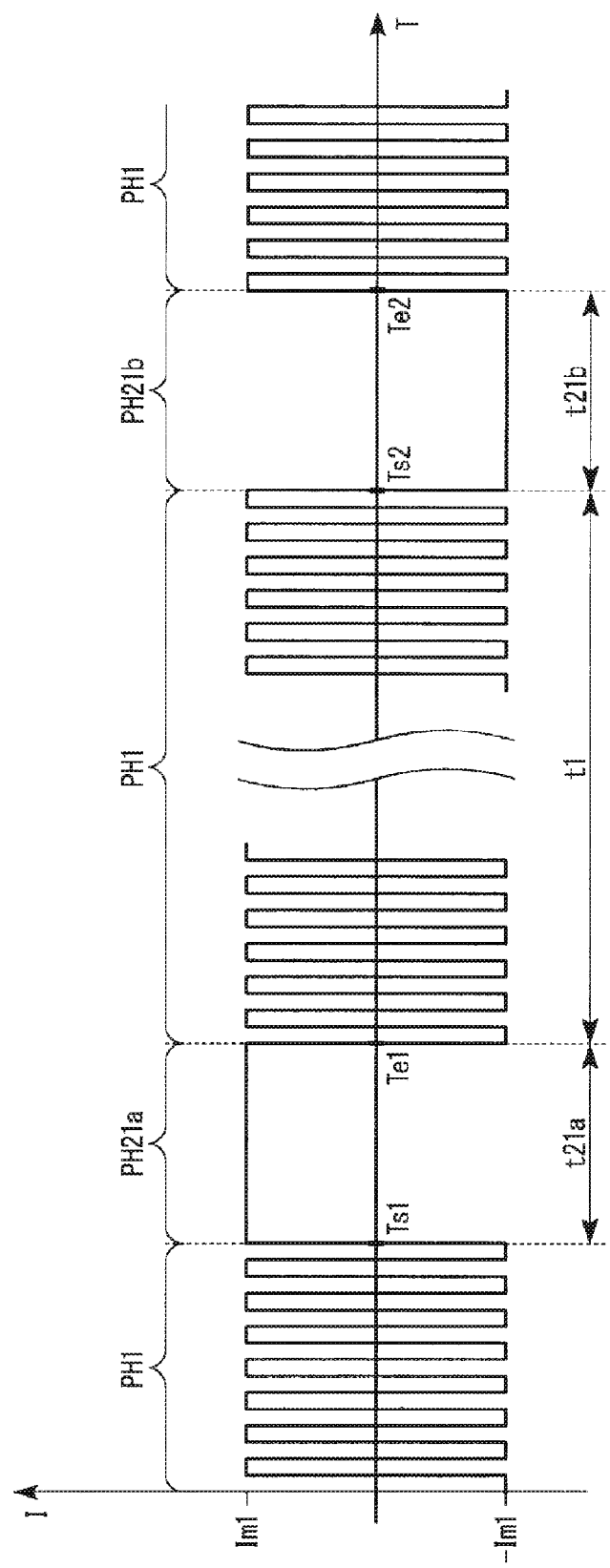
FIG. 7 is a diagram showing an example of a drive current waveform in the first embodiment.

FIG. 7 is a diagram showing an example of the drive current waveform in this embodiment. In FIG. 7, the horizontal axis shows time T, and the vertical axis shows a current value of the drive current I. A positive value shows the first polarity state, and a negative value shows the second polarity state. In addition, in the example of FIG. 7, a waveform in a case where the refresh mode is not executed after the first measurement period PH21a and after a second measurement period PH21b is shown.

The drive current waveform in this embodiment has a steady lighting period PH1, the first measurement period (a measurement period) PH21a, and the second measurement period PH21b, as shown in FIG. 7.

In addition, the first measurement period PH21a and the second measurement period PH21b have the same configuration except that polarities are different from each other, and therefore, in the following description, there is a case of describing only the first measurement period PH21a as a representative.

The steady lighting period PH1 is a period in which the steady lighting mode is executed. That is, in the steady lighting period PH1, as the drive current I, an alternating current is supplied to the discharge lamp 90. For example, in the example of FIG. 7, in the steady lighting period PH1, a rectangular wave alternating current is supplied to the discharge lamp 90. In the example of FIG. 7, the value of the drive current I in the first polarity state in the steady lighting period PH1 is Im1, and the value of the drive current I in the second polarity state in the steady lighting period PH1 is −Im1.

The first measurement period PH21a is a period in which the first measurement mode is executed. That is, in first measurement period PH21a, the polarity of the drive current I is maintained constant in the first polarity state. In this embodiment, the value of the drive current I in the first measurement period PH21a is Im1 which is equal to the value of the drive current I in the first polarity state in the steady lighting period PH1.

A length t21a of the first measurement period PH21a is larger than the length of the half cycle of the alternating current in the steady lighting period PH1 in which the steady lighting mode is executed. In other words, the length t21a of the first measurement period PH21a is larger than a length from switching of a polarity state to switching to the next polarity state in the steady lighting period PH1 in which the polarity state is alternately switched.

The second measurement period PH21b is a period in which the second measurement mode is executed. In the second measurement period PH21b, the polarity of the drive current I is maintained constant in the second polarity state. In this embodiment, the value of the drive current I in the second measurement period PH21b is −Im1 which is equal to the value of the drive current I in the second polarity state in the steady lighting period PH1. A length t21b of the second measurement period PH21b is larger than the length of the half cycle of the alternating current in the steady lighting period PH1 in which the steady lighting mode is executed, similar to the first measurement period PH21a.

In this embodiment, the second measurement period PH21b is provided after a predetermined time after the first measurement period PH21a ends. That is, the second measurement period PH21b is provided to be temporally separated from the first measurement period PH21a. For example, in the example of FIG. 7, the steady lighting mode PH1 is present between a point of time (an ending time Te1) when the first measurement period PH21a ends and a point of time (a start time Ts2) when the second measurement period PH21b is started. A length t1 between the first measurement period PH21a and the second measurement period PH21b can be appropriately set according to the growth degree or the like of the first electrode 92.

Although illustration is omitted, in the drive current waveform in this embodiment, the first measurement period PH21a is provided again after a predetermined time after the second measurement period PH21b ends. That is, in the drive current waveform in this embodiment, the first measurement period PH21a and the second measurement period PH21b are alternately provided to be temporally separated from each other.

The length t21a of the first measurement period PH21a and the length t21b of the second measurement period PH21b are set to be in a range of 20 ms (milliseconds) or more and 100 ms (milliseconds) or less, for example. By setting the lengths in this manner, it is easy to detect the thicknesses of the projections 531p and 541p while suppressing the projections 531p and 541p of the first electrode 92 and the second electrode 93 being missing.

Next, control of the discharge lamp drive unit 230 by the control unit 40 of this embodiment will be described.

Figure 8:
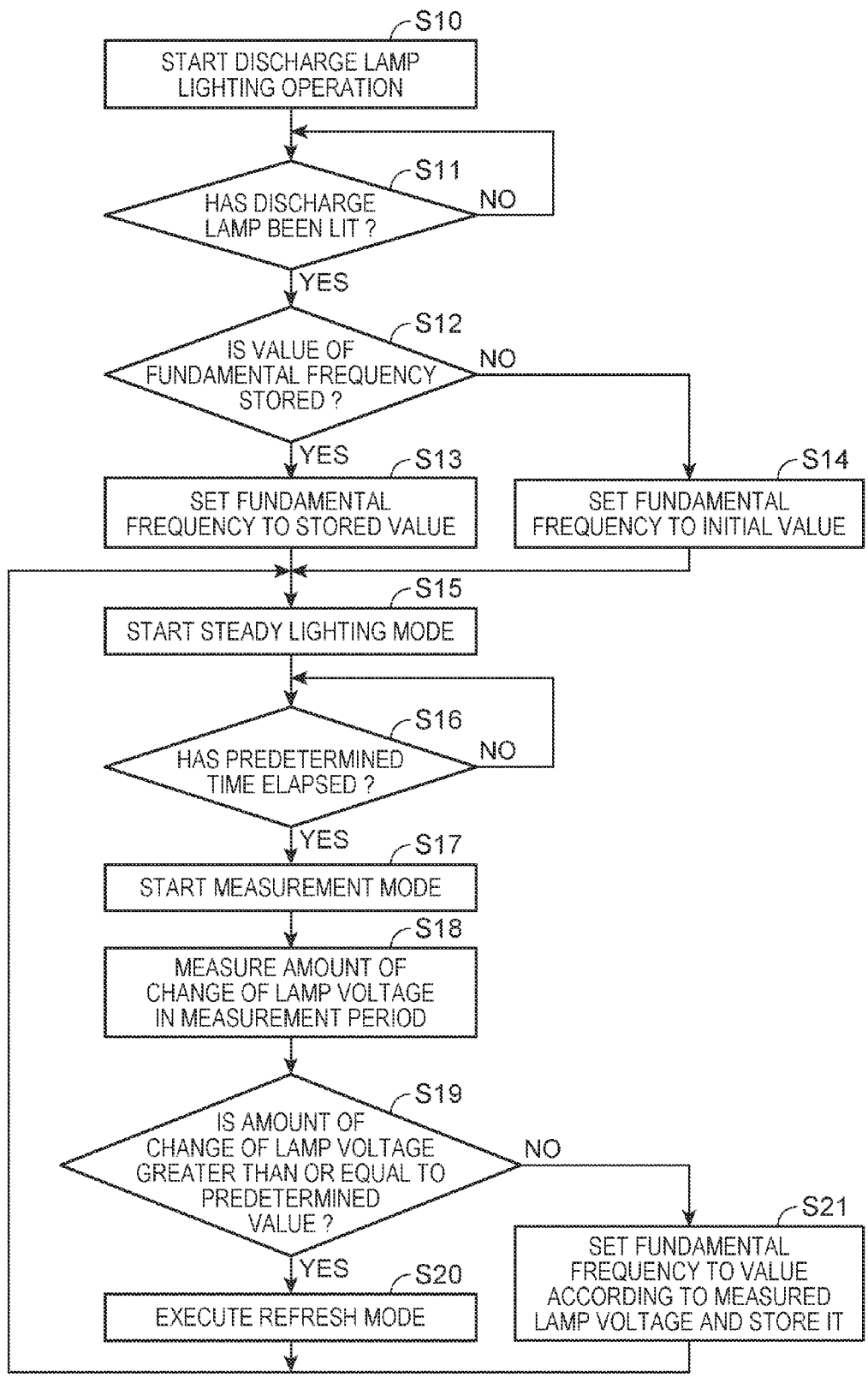
FIG. 8 is a flowchart showing an example of control procedure of a discharge lamp drive unit by the control unit of the first embodiment.

FIG. 8 is a flowchart showing the procedure of the control of the discharge lamp drive unit 230 by the control unit 40 of this embodiment.

As shown in FIG. 8, if a power supply of the projector 500 is turned on, the control unit 40 starts a discharge lamp lighting operation (Step S10).

Next, the control unit 40 determines whether or not the discharge lamp 90 has been lit (Step S11). In a case where the discharge lamp 90 is not lit (Step S11: NO), the control unit 40 continues with the discharge lamp lighting operation.

If the discharge lamp 90 is lit (Step S11: YES), the control unit 40 determines whether or not the value of a previous fundamental frequency is stored in the storage unit (Step S12). In a case where the value of the previous fundamental frequency is stored in the storage unit 44 (Step S12: YES), the fundamental frequency of the drive current I in the steady lighting mode is set to the value of the previous fundamental frequency stored (Step S13). In a case where the value of the fundamental frequency is not stored in the storage unit 44 (Step S12: NO), the fundamental frequency is set to the initial value (Step S14). Thereafter, the control unit 40 starts the steady lighting mode (S15).

After the steady lighting mode is started, the control unit 40 determines whether or not a predetermined time has elapsed since the steady lighting mode is executed (Step S16). The control unit 40 executes the steady lighting mode until a predetermined time elapses (Step S16: NO). If a predetermined time elapses (Step S16: YES), the control unit 40 executes the measurement mode (Step S17). Here, as an example, a case where the first measurement mode is executed will be described.

The control unit 40 measures the amount of change of the lamp voltage Vla in the first measurement period PH21a shown in FIG. 7 (Step S18). Specifically, the control unit controls the voltage detection unit of the operation detection unit 60 so as to measure the lamp voltage Vla at least twice (multiple times) in the first measurement period PH21a. In this embodiment, for example, the voltage detection unit of the operation detection unit 60 measures the lamp voltage Vla at each of a start time Ts1 of the first measurement period PH21a and the ending time Te1 of the first measurement period PH21a and calculates the amount of change of the lamp voltage Vla.

Here, a change of the lamp voltage Vla in the first measurement period PH21a will be described.

Figure 9:
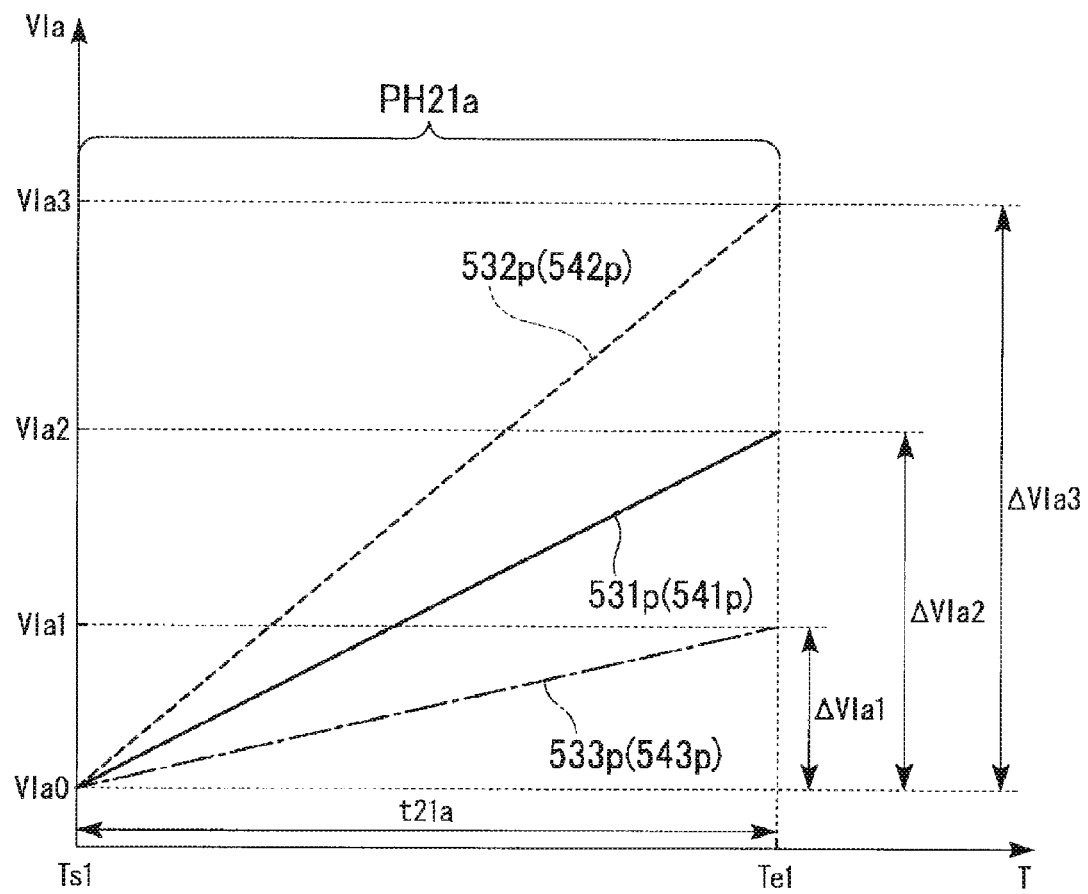
FIG. 9 is a graph showing a change of a lamp voltage in a measurement period.

FIG. 9 is a graph showing a change of the lamp voltage Vla in a first measurement period PH21a. In FIG. 9, the vertical axis shows the lamp voltage Vla, and the horizontal axis shows the time T. In FIG. 9, a change of the lamp voltage Vla in each of a case where the projections of the first electrode 92 and the second electrode 93 are the projections 531p and 541p shown in FIGS. 6A and 6B, a case where the projections are projections 532p and 542p, and a case where the projections are projections 533p and 543p is shown.

As shown in FIGS. 6A and 6B, the projection 532p of the first electrode 92 is a projection thinner than the projection 531p. The projection 533p of the first electrode 92 is a projection thicker than the projection 531p. The thickness of the projection 541p of the second electrode 93 is the same as the thickness of the projection 531p of the first electrode 92. The thickness of the projection 542p of the second electrode 93 is the same as the thickness of the projection 532p of the first electrode 92. The thickness of the projection 543p of the second electrode 93 is the same as the thickness of the projection 533p of the first electrode 92.

The positions of the end portions on the second electrode 93 side in the respective projections 531p, 532p, and 533p of the first electrode 92 are the same. The positions of the end portions on the first electrode 92 side in the respective projections 541p, 542p, and 543p of the second electrode 93 are the same. That is, also in the case of any projection, the inter-electrode distance L is the same. In other words, also in the case of any projection, in the states shown in FIGS. 6A and 6B, the value of the lamp voltage Vla is the same.

In FIG. 9, a change of the lamp voltage Vla in the case of the projections 531p and 541p is shown by a solid line. A change of the lamp voltage Vla in the case of the projections 532p and 542p is shown by a dashed line. A change of the lamp voltage Vla in the case of the projections 533p and 543p is shown by a dot-and-dash line. The value of the lamp voltage Vla at the point of time (the start time Ts1) when the first measurement period PH21a is started is Vla0.

As shown in FIG. 9, the lamp voltage Vla in the first measurement period PH21a increases in proportion to the time T, for example. In the case of the projections 531p and 541p, the lamp voltage Vla changes from Vla0 to Vla2. In the case of the projections 532p and 542p, the lamp voltage Vla changes from Vla0 to Vla3 which is greater than Vla2. In the case of the projections 533p and 543p, the lamp voltage Vla changes from Vla0 to Vla1 which is smaller than Vla2.

That is, the amount of change $\Delta V1a2$ of the lamp voltage Vla in the case of the projections 531p and 541p is smaller than the amount of change $\Delta V1a3$ of the lamp voltage Vla in the case of the projections 532*p* and 542*p*. The amount of change AV1*a*2 of the lamp voltage Vla in the case of the projections 531*p* and 541*p* is greater than the amount of change AV1*a*1 of the lamp voltage Vla in the case of the projections 533*p* and 543*p*.

As described above, if the drive current I is supplied to the discharge lamp 90, electrons collide with the projection of the electrode on the positive pole side, and thus the lamp voltage Vla rises. At this time, the thicker the thickness of the projection, the more it is difficult for the inter-electrode distance L to increase even if the projection is shaved off, and it is difficult for the lamp voltage Vla to rise. Therefore, the thicker the projection of the electrode, the smaller the amount of change of the lamp voltage Vla in the first measurement period PH21*a* becomes. In the first measurement period PH21*a*, the first electrode 92 is a positive pole, and therefore, the amount of change of the lamp voltage Vla is determined according to the thickness of the projection of the first electrode 92. In this way, as described above, the amount of change of the lamp voltage Vla in the first measurement period PH21*a* is different according to the thickness of the projection.

In addition, also in the second measurement period PH21*b*, the lamp voltage Vla changes in the same manner as that in the first measurement period PH21*a*.

Referring back to FIG. 8, the control unit 40 determines whether or not the amount of change of the lamp voltage Vla in the first measurement period PH21*a* is greater than or equal to a predetermined value (Step S19). In a case where the amount of change of the lamp voltage Vla is greater than or equal to a predetermined value (Step S19: YES), the control unit 40 executes the refresh mode (Step S20). Then, the control unit 40 starts the steady lighting mode again after the execution of the refresh mode (Step S15).

As the predetermined value to determine the amount of change of the lamp voltage Vla, the amount of change AV1*a*1 shown in FIG. 9 can be adopted as an example. In this case, when the thickness of the projection of the first electrode 92 is less than or equal to the thickness of the projection 532*p* shown in FIGS. 6A and 6B, the refresh mode is executed.

In a case where the amount of change of the lamp voltage Vla is smaller than the predetermined value (Step S19: NO), that is, as an example, in a case where the thickness of the projection of the first electrode 92 is greater than the thickness of the projection 532*p* shown in FIGS. 6A and 6B, the control unit 40 does not execute the refresh mode. In this case, the control unit 40 sets the fundamental frequency of the drive current I in the steady lighting mode according to the value of the lamp voltage Vla measured in the first measurement period PH21*a* (Step S21). Then, the control unit 40 stores the value of the set fundamental frequency in the storage unit 44 (Step S21) and starts the steady lighting mode again (Step S15).

In this embodiment, the first measurement period PH21*a* and the second measurement period PH21*b* are alternately provided, and therefore, after the steady lighting mode is started again, when a predetermined has elapsed, the control unit 40 executes the second measurement mode.

Then, for example, the voltage detection unit detects the lamp voltage Vla at the start time Ts2 of the second measurement period PH21*b* and an ending time Te2 of the second measurement period PH21*b* and calculates the amount of change of the lamp voltage Vla. At this time, in the second measurement period PH21*b*, the second electrode 93 becomes a positive pole, and therefore, the amount of change of the lamp voltage Vla is determined according to the thickness of the projection of the second electrode 93. The control unit 40 determines whether or not the amount of change of the lamp voltage Vla is greater than or equal to a predetermined value, in the same manner as described above, and determines the presence or absence of the execution of the refresh mode.

In this way, the control unit 40 controls the discharge lamp drive unit 230.

In addition, the control of the discharge lamp drive unit 230 by the control unit 40 described above can also be expressed as a discharge lamp driving method. That is, a discharge lamp driving method of this embodiment is a discharge lamp driving method of supplying the drive current I to the discharge lamp 90 having the first electrode 92 and the second electrode 93, thereby driving the discharge lamp 90, including: including the measurement mode in which the polarity of the drive current I is maintained constant; measuring the lamp voltage Vla multiple times in the measurement period in the measurement mode is executed, that is, in each of the first measurement period PH21*a* and the second measurement period PH21*b*; and determining the states of the first electrode 92 and the second electrode 93 of the discharge lamp 90, based on a plurality of the lamp voltages Vla measured.

According to this embodiment, the first measurement period PH21*a* and the second measurement period PH21*b*, in which the polarity of the drive current I is maintained constant, are provided, and the control unit 40 measures the lamp voltage Vla at least twice in each of the first measurement period PH21*a* and the second measurement period PH21*b*. The control unit 40 determines the states of the first electrode 92 and the state of the second electrode 93, based on the measured lamp voltage Vla.

Specifically, the control unit 40 can determine the inter-electrode distance L between the first electrode 92 and the second electrode 93 from the measured lamp voltage Vla. Further, the control unit 40 can determine the thickness of the projection of the first electrode 92 and the thickness of the projection of the second electrode 93 by calculating the amount of change of the lamp voltage Vla, based on the lamp voltages Vla measured at least twice. That is, the control unit 40 determines that the thickness of the projection of the first electrode 92 and the thickness of the projection of the second electrode 93 are thin, if the amount of change of the lamp voltage Vla is large, and determines that the thickness of the projection of the first electrode 92 and the thickness of the projection of the second electrode 93 are thick, if the amount of change of the lamp voltage Vla is small.

In this way, the control unit 40 can determine not only the inter-electrode distance L, but also the thickness of the projection of the first electrode 92 and the thickness of the projection of the second electrode 93, as the state of the first electrode 92 and the state of the second electrode 93. For this reason, the control unit 40 can more accurately grasp the state of the first electrode 92 and the state of the second electrode 93. Therefore, the life of the discharge lamp 90 can be improved by controlling the discharge lamp drive unit 230 according to the state of the first electrode 92 and the state of the second electrode 93 determined.

Further, according to this embodiment, the length t21*a* of the first measurement period PH21*a* is greater than the length of the half cycle of the alternating current in the steady lighting period PH1. For this reason, it is possible to increase a difference in the amount of change of the lamp voltage Vla in the first measurement period PH21*a* according to the thickness of the projection of the first electrode 92.

Therefore, according to this embodiment, it is easy to more accurately grasp the thickness of the first electrode 92, based on the amount of change of the lamp voltage Vla.

Further, according to this embodiment, the first measurement period PH21a and the second measurement period PH21b are provided, and therefore, it is possible to grasp both of the thickness of the projection of the first electrode 92 and the thickness of the projection of the second electrode 93.

Further, according to this embodiment, the second measurement period PH21b is provided to be temporally separated from the first measurement period PH21a. For this reason, after the first measurement period PH21a ends, the second measurement period PH21b is provided after the first electrode 92 melted in the first measurement period PH21a grows to some extent and thus the shape is arranged. In this way, the second measurement period PH21b is provided in a state where the shape of the first electrode 92 and the shape of the second electrode 93 are stable and thus arc discharge is stable. Therefore, according to this embodiment, it is possible to more accurately grasp the thickness of the second electrode 93 in the second measurement period PH21b.

Further, according to this embodiment, the control unit 40 calculates the amount of change of the lamp voltage Vla and executes drive to cause growths of the projections of the electrodes, that is, the refresh mode, in a case where the amount of change is greater than or equal to a predetermined value. That is, the control unit 40 executes the refresh mode in a case where it is determined that the thickness of the projection of the first electrode 92 is thinned to some extent. In this way, according to this embodiment, it is possible to appropriately execute the refresh mode, and thus it is possible to improve the life of the discharge lamp 90.

In addition, in this embodiment, it is also possible to adopt the following configurations and methods.

In the above description, a configuration has been described in which the lamp voltage Vla is detected at the start time Ts1 and the ending time Te1 of the first measurement period PH21a. However, there is no limitation thereto. In this embodiment, the lamp voltage Vla may be detected at any position to the extent that the lamp voltage Vla is measured at least twice in the first measurement period PH21a.

Further, in this embodiment, the control unit 40 may detect the lamp voltage Vla three or more times in the first measurement period PH21a and determine the state of the first electrode 92, based on the detected lamp voltage Vla. According to this configuration, it is easy to more accurately grasp the state of the first electrode 92.

Further, in this embodiment, the first measurement period PH21a may be provided by increasing a duty ratio of a period which enters the first polarity state in the steady lighting period PH1. In this case, for example, an alternating current period in which an alternating current with a changed duty ratio is supplied to the discharge lamp 90 is provided by one period to be temporally continuous after the steady lighting period PH1. A period which enters the first polarity state, of an alternating current period in which a duty ratio is changed, is equivalent to the first measurement period PH21a. According to this configuration, it is possible to provide the first measurement period PH21a by changing a duty ratio of the drive current I in the steady lighting period PH1, and therefore, the control of the discharge lamp drive unit 230 by the control unit 40 is simple. The second measurement period PH21b can also be provided similarly.

In addition, in a case where the duty ratio is changed, the total length of the length of the first measurement period PH21a and the length of a period which is provided to be temporally continuous with the first measurement period PH21a and has a polarity opposite to the polarity of the first measurement period PH21a, that is, a period which enters the second polarity state of an alternating current with a changed duty ratio, is approximately equal to the length of one cycle of an alternating current in the steady lighting period PH1.

Further, in the above description, a configuration has been described in which the refresh mode is executed immediately after the first measurement period PH21a. However, there is no limitation thereto. In this embodiment, for example, a configuration is also acceptable in which the refresh mode is executed in a rising period from the start of the lighting of the discharge lamp 90 to the transition to the steady lighting mode. In this case, the control unit 40 makes an execution flag which executes the refresh mode be ON in a case where it is determined that the amount of change of the lamp voltage Vla in the first measurement period PH21a is greater than or equal to a predetermined value. Then, the control unit 40 executes the refresh mode, based on the execution flap in a rising period when the discharge lamp 90 is temporarily turned off and is lit again.

Further, in this embodiment, a predetermined value at which the control unit 40 determines the presence or absence of the execution of the refresh mode may be set based on the value of the lamp voltage Vla measured in the first measurement period PH21a. As an example, the larger the value of the lamp voltage Vla, the smaller the predetermined value may be. According to this configuration, the more the state where the progression degree of deterioration is large, that is, the state where the lamp voltage Vla is large, the more the refresh mode is easily executed, and thus it is possible to further improve the life of the discharge lamp 90.

Further, in this embodiment, either of the first measurement period PH21a and the second measurement period PH21b may not be provided.

Further, in this embodiment, the length of the first measurement period PH21a and the length of the second measurement period PH21b may be set according to the value of drive power which is supplied to the discharge lamp 90 in the steady lighting period PH1 in which the steady lighting mode is executed.

Further, in this embodiment, the predetermined value to determine the amount of change of the lamp voltage Vla in the first measurement period PH21a and the second measurement period PH21b may be set according to the value of drive power which is supplied to the discharge lamp 90 in the steady lighting period PH1 in which the steady lighting mode is executed.

Second Embodiment

A second embodiment is different from the first embodiment in that the first measurement period PH21a and the second measurement period PH21b are provided to be temporally continuous.

In addition, with respect to the same configurations as those in the first embodiment, the configurations are appropriately denoted by the same reference numerals, and thus there is a case where description thereof is omitted.

Figure 10:
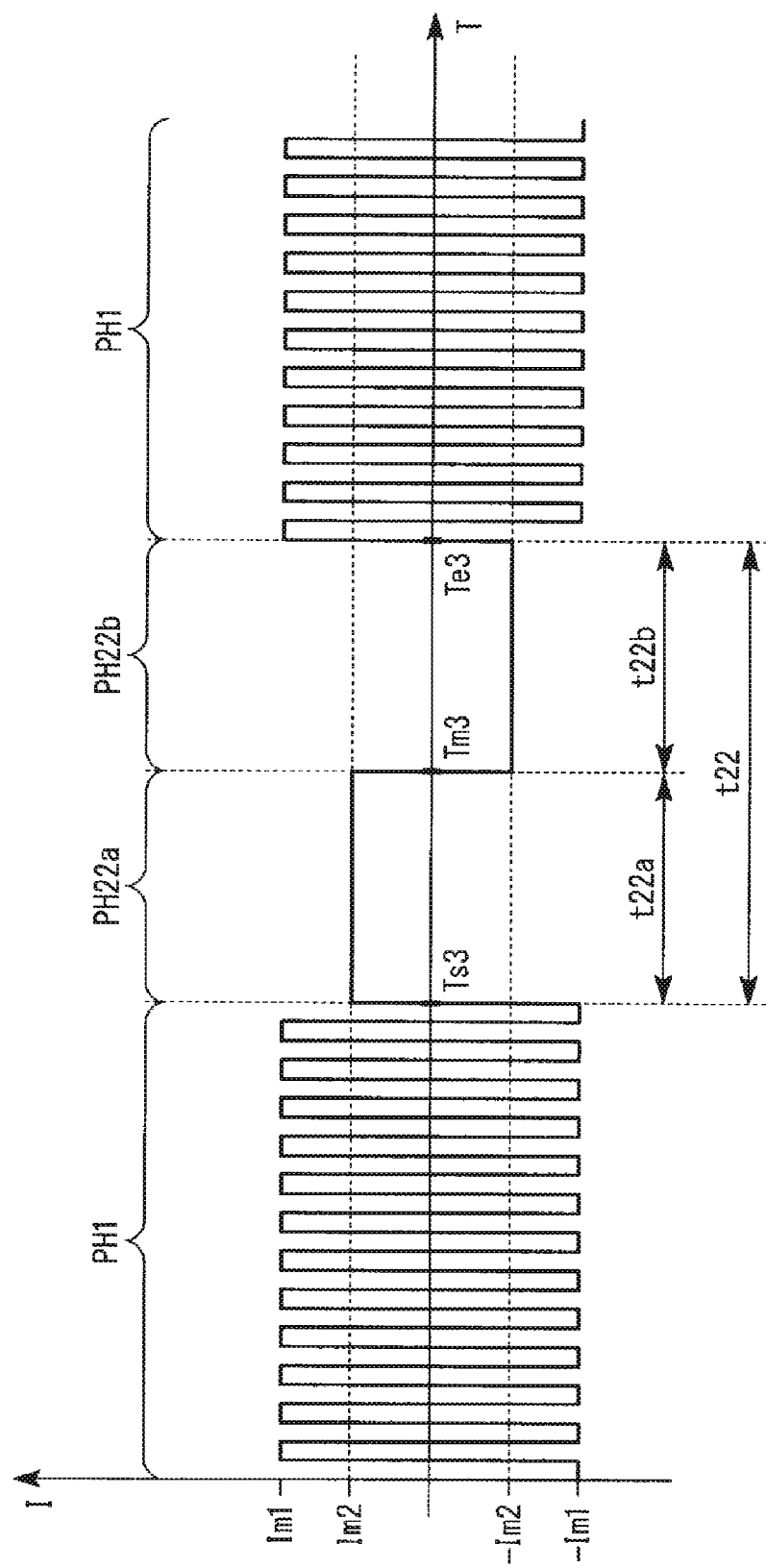
FIG. 10 is a diagram showing an example of a drive current waveform in a second embodiment.

FIG. 10 is a diagram showing an example of a drive current waveform in this embodiment. In FIG. 10, the horizontal axis shows time T, and the vertical axis shows a current value of the drive current I. A positive value shows a first polarity state, and a negative value shows a second polarity state. In addition, in the example of FIG. 10, a waveform in a case where the refresh mode is not executed after the second measurement period PH22b is shown.

The drive current waveform in this embodiment has the steady lighting period PH1, the first measurement period (a measurement period) PH22a, and the second measurement period PH22b, as shown in FIG. 10.

In the example shown in FIG. 10, the value of the drive current I in the first measurement period PH22a is Im2 which is smaller than Im1. That is, the absolute value of the drive current I which is supplied to the discharge lamp 90 in the first measurement period PH22a is smaller than the absolute value of the drive current which is supplied to the discharge lamp 90 in the steady lighting period PH1.

The second measurement period PH22b is provided to be temporally continuous after the first measurement period PH22a. In the example shown in FIG. 10, the value of the drive current I in the second measurement period PH22b is −Im2. That is, the absolute value of the drive current I which is supplied to the discharge lamp 90 in the second measurement period PH22b is smaller than the absolute value of the drive current which is supplied to the discharge lamp 90 in the steady lighting period PH1.

In this embodiment, a length t22a of the first measurement period PH22a and a length t22b of the second measurement period PH22b are approximately equal to each other. That is, in the combined period of the first measurement period PH22a and the second measurement period PH22b, it is equivalent to a rectangular wave alternating current in which the length of one cycle is a combined length t22 of the length t22a and the length t22b being supplied to the discharge lamp 90.

Similar to the first embodiment, the length t22a of the first measurement period PH22a is greater than the length of the half cycle of the alternating current in the steady lighting period PH1 in which the steady lighting mode is executed. The length t22b of the second measurement period PH22b is greater than the length of the half cycle of the alternating current in the steady lighting period PH1 in which the steady lighting mode is executed.

The configurations other than the above of the first measurement period PH22a are the same as those of the first measurement period PH21a in the first embodiment. The configurations other than the above of the second measurement period PH22b are the same as those of the second measurement period PH21b in the first embodiment.

Next, control of the discharge lamp drive unit 230 by the control unit 40 of this embodiment will be described.

Figure 11:
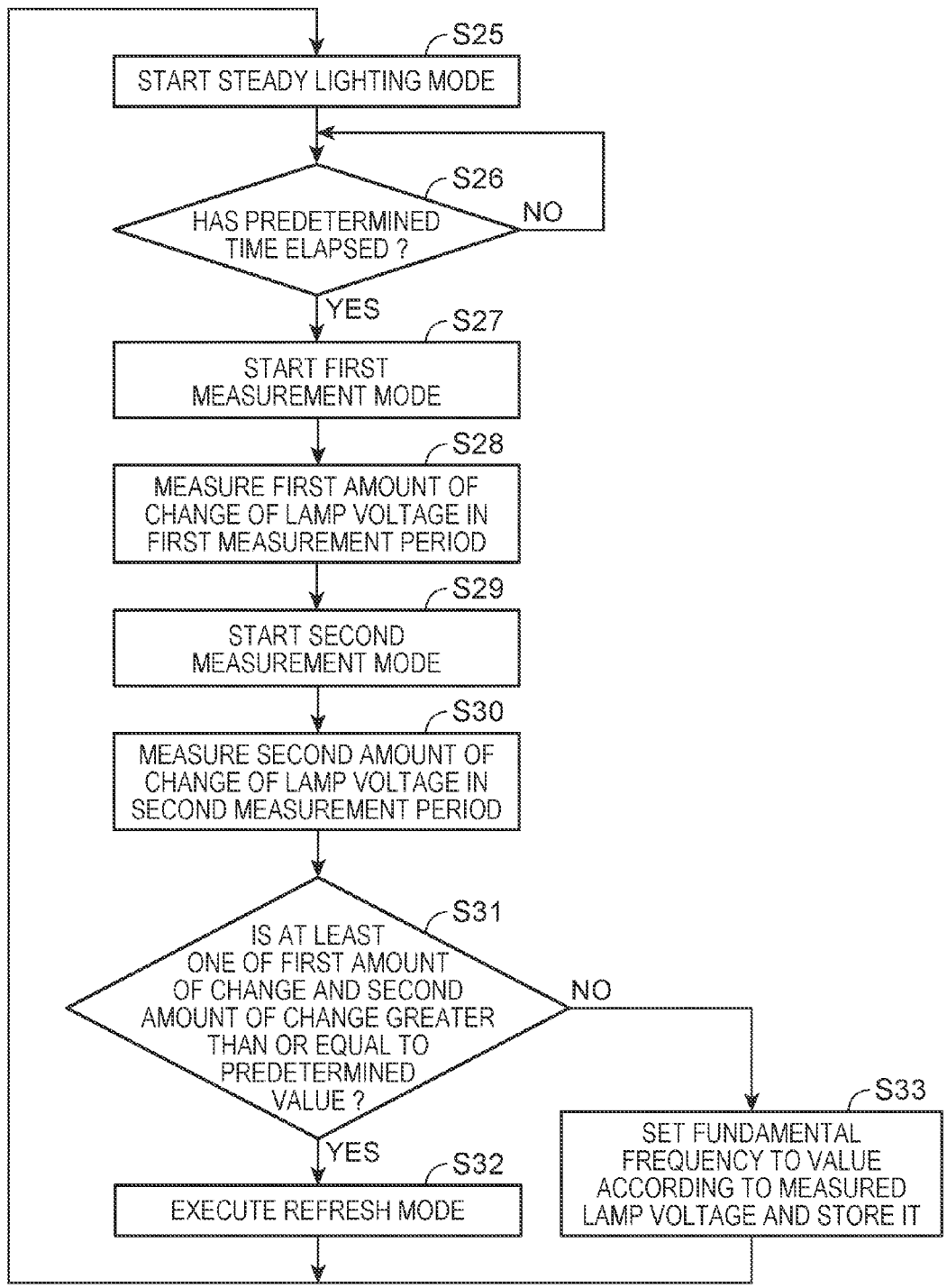
FIG. 11 is a flowchart showing an example of control procedure of the discharge lamp drive unit by a control unit of the second embodiment.

FIG. 11 is a flowchart showing the procedure of the control of the discharge lamp drive unit 230 by the control unit 40 of this embodiment. The procedure until the discharge lamp 90 is lit is the same as that in the first embodiment, and therefore, in FIG. 11, it is omitted.

As shown in FIG. 11, the control unit 40 starts the steady lighting mode (Step S25) and then starts the first measurement mode (Step S27) when a predetermined time has elapsed (Step S26). Then, the control unit 40 measures the first amount of change of the lamp voltage Vla in the first measurement period PH22a in which the first measurement mode is executed (Step S28). In this embodiment, for example, the voltage detection unit of the operation detection unit 60 detects the lamp voltage Vla at a start time Ts3 of the first measurement period PH22a and a time Tm3 which is an ending time of the first measurement period PH22a, thereby measuring the first amount of change of the lamp voltage Vla in the first measurement period PH22a.

Thereafter, the control unit 40 starts the second measurement mode continuously with the first measurement mode (Step S29). Then, the control unit 40 measures the second amount of change of the lamp voltage Vla in the second measurement period PH22b in which the second measurement mode is executed (Step S30). In this embodiment, for example, the voltage detection unit of the operation detection unit 60 detects the lamp voltage Vla at the time Tm3 which is a start time of the second measurement period PH22b and an ending time Te3 of the second measurement period PH22b, thereby measuring the second amount of change of the lamp voltage Vla in the second measurement period PH22b.

Next, the control unit 40 determines whether or not at least one of the first amount of change and the second amount of change is greater than or equal to a predetermined value (Step S31). The control unit 40 executes the refresh mode (Step S32) in a case where at least one of the first amount of change and the second amount of change of the lamp voltage Vla is greater than or equal to a predetermined value (Step S31: YES).

On the other hand, in a case where both of the first amount of change and the second amount of change of the lamp voltage Vla are smaller than a predetermined value (Step S31: NO), the control unit 40 sets the fundamental frequency of the drive current I in the steady lighting mode according to the values of the lamp voltages Vla measured in the first measurement period PH22a and the second measurement period PH22b (Step S33). Then, the control unit 40 stores the value of the set fundamental frequency in the storage unit 44 (Step S33) and starts the steady lighting mode again (Step S25).

In this way, the control unit 40 controls the discharge lamp drive unit 230.

As in this embodiment, in a case where the absolute value of the drive current I varies with respect to the steady lighting period PH1 in the first measurement period PH22a and the second measurement period PH22b, it is preferable that the first measurement period PH22a and the second measurement period PH22b are provided in a period in which it is difficult to affect a picture which is emitted from the projector 500. This is because the intensity of light which is emitted from the discharge lamp 90 changes at the time of switching from the steady lighting period PH1 to the first measurement period PH22a.

The period in which it is difficult to affect a picture which is emitted from the projector 500 includes, for example, a period in which it is difficult for a user to recognize a luminance change of a picture, a period in which user's interest in a luminance change of a picture is relatively low, and the like.

As an example, it is preferable that the first measurement period PH22a and the second measurement period PH22b are provided when a user performs an operation such as opening a menu screen of the projector 500 or turning off a power supply. This is because in such a case, user's interest in a luminance change of a picture which is displayed tends to become relatively low. In a case where a user performs an operation to turn off a power supply, user's interest in a luminance change of a picture tends to become particularly low. Further, in a case where a user performs an operation to open a menu screen, by providing the first measurement period PH22a and the second measurement period PH22b in accordance with a display of the menu screen, it is possible to make it difficult to cause a user to recognize a change in luminance.

In the case as described above, when an input receiving unit which receives an operation of a user receives a user's operation to open a menu screen and an operation to turn off a power supply, the control unit 40 executes the measurement mode.

Further, as another example, the first measurement period PH22a and the second measurement period PH22b may be provided immediately after the discharge lamp 90 is lit and enters the steady lighting period PH1. This is because immediately after the lighting of the discharge lamp 90, user's interest in a picture tends to become low due to, for example, screen adjustment or the like.

Further, in a case where a period in which light which is emitted from the discharge lamp 90 is not projected from the projection optical system 350 is provided, it is preferable that the measurement mode is executed in the period. This is because a luminance change of light which is emitted from the discharge lamp 90 does not affect a picture which is emitted from the projector 500.

According to this embodiment, the absolute value of the drive current I in the first measurement period PH22a is smaller than the absolute value of the drive current I in the steady lighting period PH1. For this reason, even in a case where the length t22a of the first measurement period PH22a is large, it is possible to suppress damage or the like due to the projection of the first electrode 92 being excessively melted, thereby being lost, and the discharge lamp 90 being excessively heated.

Further, according to this embodiment, the first measurement period PH22a and the second measurement period PH22b are provided to be temporally continuous, and therefore, it is possible to grasp the state of the first electrode 92 and the state of the second electrode 93 at a time.

Further, according to this embodiment, the length t22a of the first measurement period PH22a and the length t22b of the second measurement period PH22b are approximately equal to each other. For this reason, by supplying an alternating current in which the length of one cycle is t22 to the discharge lamp 90 by one cycle, it is possible to execute the first measurement mode and the second measurement mode. Therefore, according to this embodiment, the control of the discharge lamp drive unit 230 by the control unit 40 is simple.

In addition, in this embodiment, the length t22a of the first measurement period PH22a and the length t22b of the second measurement period PH22b may be different from each other.

Further, in the embodiments described above, an example in a case where the invention is applied to a transmission type projector has been described. However, the invention can also be applied to a reflection type projector. Here, a "transmission type" refers to a type in which a liquid crystal light valve which includes a liquid crystal panel or the like transmits light. A "reflection type" refers to a type in which a liquid crystal light valve reflects light. In addition, a light modulation device is not limited to a liquid crystal panel or the like and may be, for example, a light modulation device using a micromirror.

Further, in the embodiments described above, the projector 500 using the three liquid crystal panels 560R, 560G, and 560B (liquid crystal light valves 330R, 330G, and 330B) has been given as an example. However, the invention can also be applied to a projector using only one liquid crystal panel, or a projector using four or more liquid crystal panels.

Further, the respective configurations described above can be appropriately combined to the extent that they do not conflict with each other.

The entire disclosure of Japanese Patent Application No. 2015-041014, filed Mar. 3, 2015 is expressly incorporated by reference herein.

What is claimed is:

1. A discharge lamp driving device comprising:
    a discharge lamp drive unit configured to supply a drive current to a discharge lamp having two electrode;
    a voltage detection unit configured to detect an inter-electrode voltage of the discharge lamp; and
    a control unit configured to control the discharge lamp drive unit, wherein
    the control unit:
        during a first measurement period: (i) executes first measurement drive in which a polarity of the drive current is maintained constant at a first polarity, and (ii) controls the voltage detection unit to measure the inter-electrode voltage at least two times during the first measurement period,
        during a second measurement period: (i) executes second measurement drive in which the plurality of the drive current is maintained constant at a second polarity that is different from the first polarity, and (ii) controls the voltage detection unit to measure the inter-electrode voltage at least two times during the second measurement period, and
        determines a state of at least one of the two electrodes based on the at least two inter-electrode voltage measurements during the first measurement period and the at least two inter-electrode voltage measurements during the second measurement period, respectively.

2. The discharge lamp driving device according to claim 1, wherein the control unit executes steady lighting drive in which an alternating current is supplied to the discharge lamp, and a length of the first measurement period is greater than a length of a half cycle of the alternating current in a steady lighting period in which the steady lighting drive is executed.

3. The discharge lamp driving device according to claim 2, wherein an absolute value of the drive current which is supplied to the discharge lamp in the first measurement period is smaller than an absolute value of the drive current which is supplied to the discharge lamp in the steady lighting period.

4. The discharge lamp driving device according to claim 2, wherein a total length of the length of the first measurement period and a length of a period which is provided to be temporally continuous with the first measurement period and has a second polarity opposite to the first polarity is approximately equal to a length of one cycle of the alternating current in the steady lighting period.

5. The discharge lamp driving device according to claim 1, wherein the control unit calculates the amount of change in inter-electrode voltage in the first measurement period based on the at least two inter-electrode voltages measured in the first measurement period, and executes drive to cause growths of the electrodes in a case where the amount of change is greater than or equal to a predetermined value.

6. The discharge lamp driving device according to claim 1, wherein the second measurement period is provided to be temporally separated from the first measurement period.

7. The discharge lamp driving device according to claim 1, wherein the second measurement period is provided to be temporally continuous with the first measurement period.

8. The discharge lamp driving device according to claim 7, wherein a length of the first measurement period and a length of the second measurement period are approximately equal to each other.

9. The discharge lamp driving device according to claim 1, wherein the control unit
calculates a first amount of change of the inter-electrode voltage in the first measurement period based on the inter-electrode voltages measured in the first measurement period,
calculates a second amount of change of the inter-electrode voltage in the second measurement period based on the inter-electrode voltages measured in the second measurement period, and
executes drive to cause growths of the at least one of the electrodes in a case where at least one of the first amount of change and the second amount of change is greater than or equal to a predetermined value.

10. The discharge lamp driving device according to claim 5, wherein the predetermined value is set based on previously-measured amounts of change of inter-electrode voltages.

11. The discharge lamp driving device according to claim 9, wherein the predetermined value is set based on previously-measured amounts of change of inter-electrode voltages.

12. The projector according to claim 1, wherein the control unit determines a thickness of a tip portion of at least one of the two electrodes based on an amount of change between the at least two inter-electrode voltage measurements during the first or second measurement periods.

13. A projector comprising:
a discharge lamp configured to emit light;
the discharge lamp driving device according to claim 1;
a light modulation element configured to modulate light which is emitted from the discharge lamp, according to a video signal; and
a projection optical system configured to project light modulated by the light modulation element.

14. The projector according to claim 13, further comprising: an input receiving unit configured to receive an operation, wherein the control unit executes the first measurement drive or second measurement drive in a case where the input receiving unit receives the operation.

15. The projector according to claim 13, wherein the control unit executes the first measurement drive or second measurement drive in a period in which the light which is emitted from the discharge lamp is not projected from the projection optical system.

\* \* \* \* \*